Nov. 16, 1971   D. J. JOGERST   3,620,086
APPARATUS FOR BALANCING SMALL WHEELS, GEARS, AND THE LIKE
Filed Feb. 9, 1970
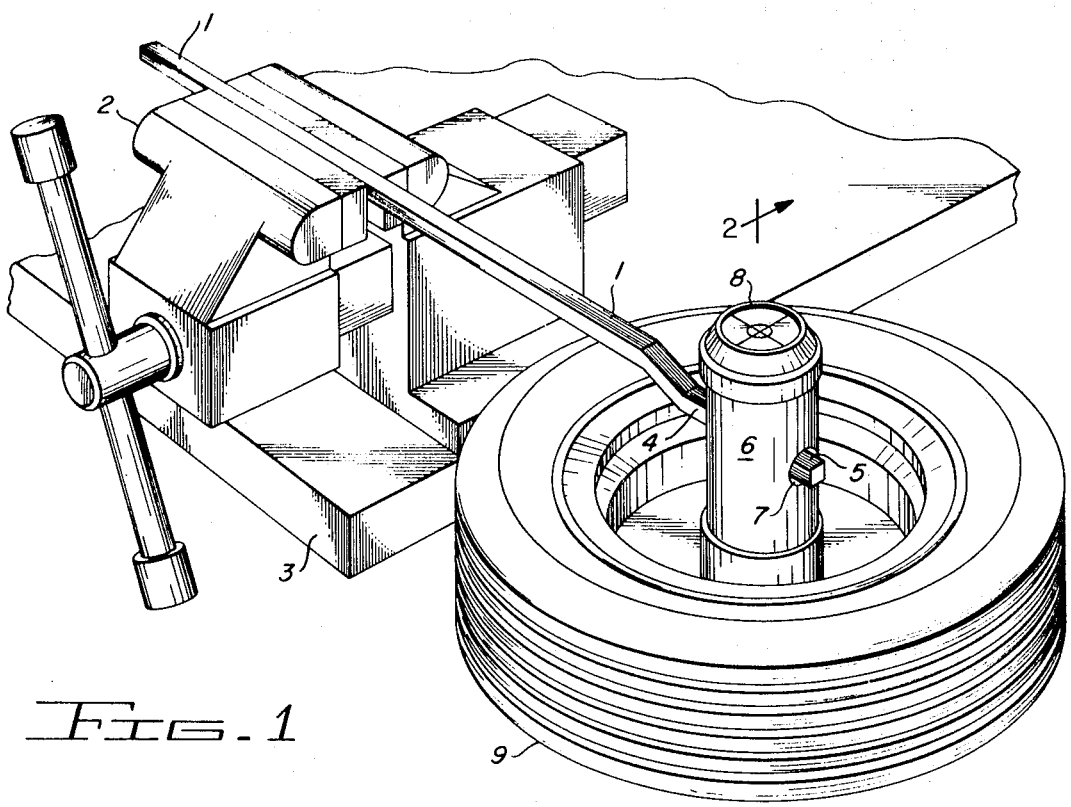
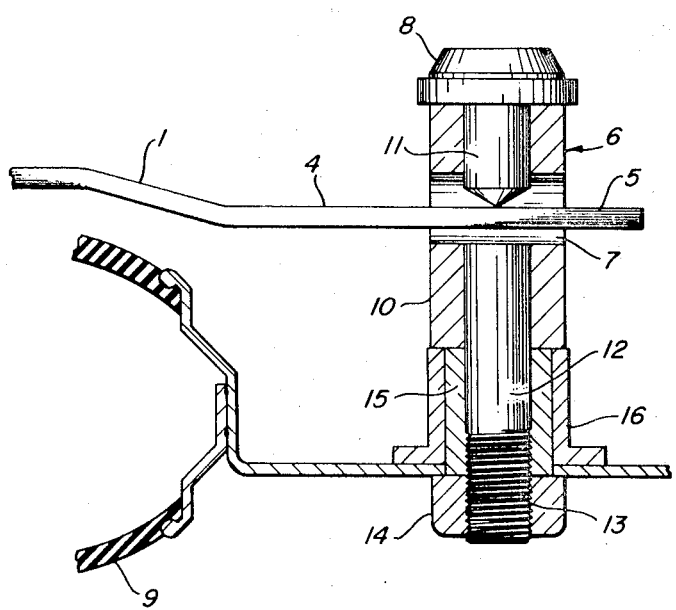
INVENTOR.
DAVID J. JOGERST
BY
Drummond, Cahill & Phillips
ATTORNEYS

United States Patent Office 3,620,086
Patented Nov. 16, 1971

3,620,086
APPARATUS FOR BALANCING SMALL WHEELS, GEARS, AND THE LIKE
David J. Jogerst, Glendale, Ariz.
(5 Bedford Court NE., Fort Walton Beach, Fla. 32548)
Filed Feb. 9, 1970, Ser. No. 9,697
Int. Cl. G01m 1/14
U.S. Cl. 73—483
1 Claim

ABSTRACT OF THE DISCLOSURE

Apparatus is provided for balancing small rotating machine elements such as go-cart wheels, gears, etc. A cantilevered support member is fixed at one end in a vise or by any other suitable means such that the free end extends horizontally. At least a portion of the upper surface of the support member is planar and is adjusted to be approximately horizontal. A generally cylindrical balance assembly includes a diametrically disposed passage extending through the body of a housing portion. A pivot member disposed co-axially within the housing extends downwardly and terminates in a point which rests upon the support member when the balance assembly is guided onto the support member free end. The underslung portion of the balance assembly includes a threaded member co-axially aligned with the housing such that an adapter and the element to be balanced can be secured in place with a cooperating nut. A bubble level is fixed to the top of the housing for indicating the inclination of the element to be balanced as it pivots about the point of the pivot member resting on the planar area of the support member.

---

This invention relates to balancing apparatus and more particularly to apparatus for balancing relatively small elements, such as go-cart wheels and gears, which rotate when carrying out their normal function.

Static wheel balancers utilizing bubble level indicators to determine the degree of imbalance are very wellknown in the art. However, the prior art static wheel balancers are best adapted to assist in bringing relatively large automobile and truck wheel and tire assemblies to a static balance. Because they are constructed primarily to carry out this function, they cannot accommodate such smaller rotating elements as go-cart wheels, gears, pulleys, etc. By way of example, go-cart wheels utilized in racing go-carts are subjected to very high angular velocities such that imbalance becomes an extremely important factor despite their relatively small diameter, and a close balance is required to minimize vibration.

It is therefore a very broad object of this invention to provide apparatus capable of balancing relatively small rotating elements.

It is a more specific object of this invention to provide apparatus for achieving a static balance to go-cart wheels, wheels of similar sizes, and other relatively small rotating elements.

The manner in which these and other objects of the invention are achieved will become more readily apparent to persons conversant in the art through a perusal of the following specification taken in conjunction with the appended claims and the figures of which:

FIG. 1 is a perspective view of the balancing apparatus of the present invention depicting its utilization in effecting static balance of a go-cart wheel; and FIG. 2 is a cross-sectional view taken along the lines 2—2 of the balance assembly of the present invention illustrating the manner in which it is supported to achieve the desired end.

Referring now to FIG. 1, it will be observed that a cantilevered support member 1 is fixed, by way of example, in the jaws of a vise 2 which is secured to a table or bench 3. The cantilevered support member 1 may be provided with a downwardly offset portion 4 to more easily accommodate elements to be balanced which may have significant thickness as will become more apparent as the description proceeds. The upper surface 5 of the downwardly offset portion 4 of the cantilevered support member 1 is planar and, as illustrated in FIG. 1, the cross section of the cantilevered support member 1 may usefully be made square or rectangular to meet this requirement and to facilitate securing the fixed end of the support member 1.

A generally cylindrical balance assembly 6 is provided with a passageway 7 through which the downwardly offset portion 4 of the cantilevered support member 1 may pass. A bubble level 8 is fitted to the top of the balance assembly 6 for indicating the extent of static imbalance of the rotating element being tested such as the go-cart wheel and tire assembly 9 illustrated by way of example in FIG. 1.

Turning now to FIG. 2, the detailed structure of the balance assembly 6 and the manner in which it is supported by the cantilevered support member 1 is illustrated. As previously noted, the downwardly offset portion 4 of the cantilevered support member 1 extends diametrically through the passageway 7 in an elongated housing portion 10 of the balance assembly 6. A downwardly projecting pivot member 11 is disposed co-axially within the upper portion of housing 10 and terminates in a point within the upper portion of the passageway 7 such that the point rests upon the planar upper surface 5 of the cantilevered support member 1. Sufficient clearance is afforded the portion of the cantilevered support member 1 which extends through the passageway 7 to permit balancing any rotating elements which can reasonably be accommodated in the manner described below.

Depending co-axially from the elongated housing portion 10 of the balance assembly 6 is a cylindrical member 12 provided with threads 13 along at least the terminal portion of its length for receiving a nut 14. A number of adapters, such as the adapter 15, may be utilized to accommodate elements to be balanced which have a central opening larger in diameter than the cylindrical member 12. Thus, as illustrated in FIG. 2, the adapter 15 is utilized to achieve a snug, co-axial fit of the go-cart hub 16 to the balance assembly 6.

The manner in which the balancing apparatus is used follows in a straightforward manner from the foregoing description of the apparatus itself. A suitable adapter 15 is selected which has an inside diameter permitting a slip fit with little play over the cylindrical member 12 and which has an outer diameter for closely receiving the co-axial opening in the element to be balanced. The adapter 15 is slipped over the cylindrical member 12 and then the element to be balanced is slipped over the adapter. The nut 14 is then threaded onto the cylindrical member 12 and tightened to hold the element to be balanced rigidly and co-axially with respect to the balance assembly 6. It has been found in practice that the downward pull of gravity usually provides sufficient vertical constraint provided a properly close fitting adapter is used.

According to the degree of imbalance, the balance assembly 6 will tilt about the point of the downwardly projecting pivot member 11 resting upon the planar upper surface 5 of the cantilevered support member 1. Weights are then shifted about the wheel rim in the usual manner until the bubble level 8 indicates that a state of static balance has been reached within the resolution of the apparatus. The offset in the support member 1 provides clearance for tires or comparably thick members as best show in FIG. 1.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Apparatus for statically balancing machine elements such as cart wheels, gears, and the like, having a co-axial opening and which rotate during normal operation comprising:

(A) a cantilevered support member including a fixed end and a free end and further including an upper surface with a planar area nominally disposed such that gravitational force is normal thereto;

(B) a balance assembly, said balance assembly including an elongated housing and a cylindrical downwardly depending member co-axially aligned with said housing for receiving a machine element to be balanced, said downwardly depending member being threaded along at least a portion of its length; an internally threaded unit adapted to be threaded onto said downwardly depending member to fix a machine element to be balanced to said apparatus; an open passage extending diametrically through said housing, said open passage being sufficiently large to receive the free end of said support member whereby said planar area is intercepted by the axis of said downwardly depending member; and a downwardly directed pivot member contained co-axially within the upper portion of said housing and terminating in a point in said passageway such that said point rests on said planar area whereby said balance assembly is afforded a degree of freedom to pivot about said point according to the clearance between said cantilevered support member and the portion of said passageway below said pivot member; and a bubble level mounted on the top of said housing for indicating the alignment of said downwardly depending member with respect to the gravitational force; and (C) an adapter member adapted to be slipped over said downwardly depending member, said adapter member being selected to have an inside diameter permitting a close slip-fit over said downwardly depending member and an outer diameter for closely receiving the co-axial opening in the element to be balanced.

References Cited
UNITED STATES PATENTS

| | | | |
|---|---|---|---|
| 1,352,905 | 9/1920 | Machrol | 73—483 |
| 2,075,421 | 3/1937 | Bennett | 73—484 |
| 2,679,751 | 6/1954 | Pfeiffer | 73—484 |
| 2,919,582 | 1/1960 | Reidel | 73—484 |
| 3,204,465 | 9/1965 | Kushmuk et al. | 73—483 |
| 3,280,640 | 10/1966 | Fuertges | 73—484 |

RICHARD C. QUEISSER, Primary Examiner

H. GOLDSTEIN, Assistant Examiner